US009441408B2

(12) United States Patent
Matsumoto et al.

(10) Patent No.: US 9,441,408 B2
(45) Date of Patent: Sep. 13, 2016

(54) PROTECTOR WITH SENSOR

(71) Applicant: Nishikawa Rubber Co., Ltd., Hiroshima-shi, Hiroshima-ken (JP)

(72) Inventors: Michihiko Matsumoto, Hiroshima (JP); Eiichi Baba, Hiroshima (JP)

(73) Assignee: NISHIKAWA RUBBER CO., LTD., Hiroshima-Shi, Hiroshima-Ken (JP)

( * ) Notice: Subject to any disclaimer, the term of this patent is extended or adjusted under 35 U.S.C. 154(b) by 0 days.

(21) Appl. No.: 14/639,752

(22) Filed: Mar. 5, 2015

(65) Prior Publication Data
US 2015/0267453 A1    Sep. 24, 2015

(30) Foreign Application Priority Data

Mar. 18, 2014    (JP) .................................. 2014-054908

(51) Int. Cl.
| | |
|---|---|
| *E05F 15/42* | (2015.01) |
| *H01H 3/14* | (2006.01) |
| *B60J 5/04* | (2006.01) |
| *B60J 5/06* | (2006.01) |
| *E05F 15/44* | (2015.01) |

(52) U.S. Cl.
CPC ................ *E05F 15/42* (2015.01); *B60J 5/047* (2013.01); *B60J 5/06* (2013.01); *H01H 3/142* (2013.01); *E05F 15/44* (2015.01); *E05F 15/443* (2015.01); *E05Y 2600/40* (2013.01); *E05Y 2800/45* (2013.01)

(58) Field of Classification Search
CPC ........ E05F 15/443; E05F 15/42; E05F 15/44
See application file for complete search history.

(56) References Cited

U.S. PATENT DOCUMENTS

| | | | | | |
|---|---|---|---|---|---|
| 5,920,044 | A | * | 7/1999 | Kaji .......................... | B60J 10/00 200/61.44 |
| 6,233,872 | B1 | * | 5/2001 | Glagow ................. | B60J 10/004 49/27 |
| 2003/0141023 | A1 | * | 7/2003 | Griebel ............... | E05B 65/0021 160/180 |
| 2013/0307567 | A1 | * | 11/2013 | Bolbocianu .............. | G01V 3/02 324/661 |

FOREIGN PATENT DOCUMENTS

| | | | |
|---|---|---|---|
| DE | 19602744 A1 | | 7/1997 |
| DE | 94 22 030 | * | 1/1998 |
| DE | 10 2011 077 014 | * | 12/2012 |
| EP | 2620577 A1 | | 7/2013 |
| GB | 2301622 A | | 12/1996 |
| JP | 3334477 B2 | | 10/2002 |
| WO | WO 00/57013 | * | 9/2000 |

OTHER PUBLICATIONS

Extended European Search Report corresponding to Application No. 15157085.0, dated Aug. 19, 2015 (9 pages).

* cited by examiner

*Primary Examiner* — Gregory Strimbu
(74) *Attorney, Agent, or Firm* — Robert P. Michal, Esq.; Carter, DeLuca, Farrell & Schmidt, LLP (57) ABSTRACT

A protector having a hollow part with a sensor that detects an object between two conductive parts. The two conductive parts having a space therebetween. The hollow part has a wall having a horseshoe shaped cross section. Both ends of the wall are connected with an installation base member. The two conductive parts including a conductive part having a convex shape and a conductive part having a concave shape. The conductive parts are positioned in a manner such that the space substantially has a V-shaped cross section and a uniform width in cross section. Both ends of the V-shaped cross section terminate on an inner surface of the wall.

8 Claims, 9 Drawing Sheets

Fig. 12

PROTECTOR WITH SENSOR

CROSS REFERENCE TO RELATED APPLICATION

This application claims the benefit under 35 USC §119 of JP Patent Application JP 2014-054908 filed Mar. 18, 2014, the entire disclosure of which is incorporated herein by reference.

BACKGROUND INFORMATION

The present invention relates to protectors with sensors. When objects including fingers are disposed between openings of automobiles and opening/closing panels which move between at least two positions to open and close the openings of automobiles, the sensors of the protectors output corresponding signals for detecting the objects. The opening/closing panels include: doors such as sliding doors on wagons, station wagons or the like sliding frontward and rearward of the automobile bodies and back doors; and sun roofs.

Figure 5:
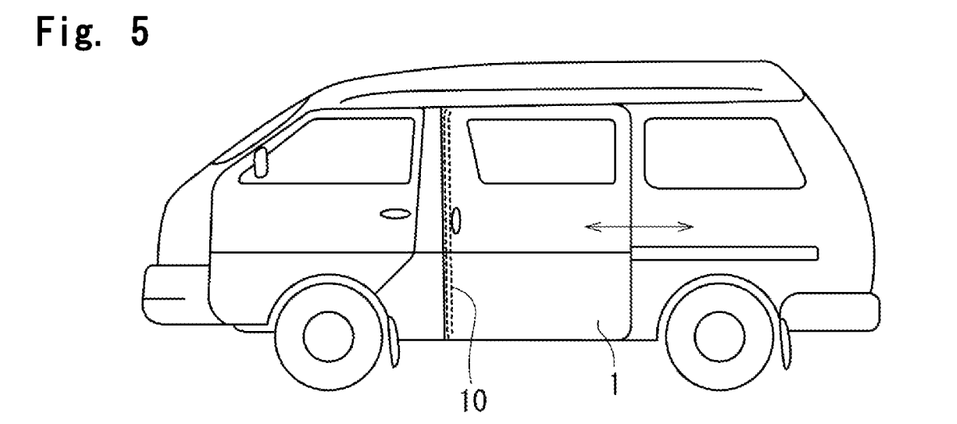
FIG. 5 is a side view of an automobile which opens or closes by a sliding door.
Figure 6:
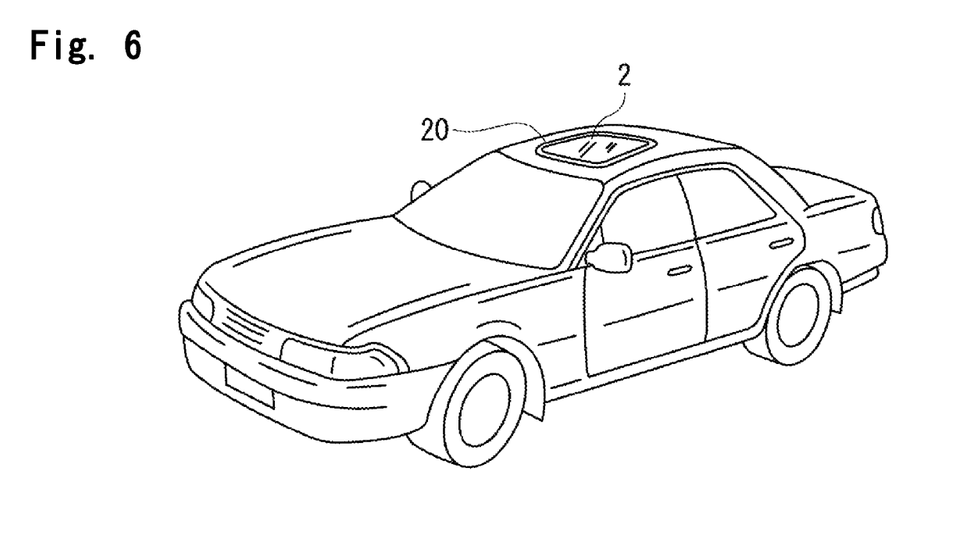
FIG. 6 is a perspective view of an automobile with a sun roof.

A protector 10, 20 with a sensor is installed on an automobile including a wagon shown in FIG. 5 of which a sliding door 1 (or a back door) moves between at least two positions to open and close an opening of an automobile body or on an automobile shown in FIG. 6 of which sun roof 2 opens or closes the opening of the automobile body.

Figure 7:
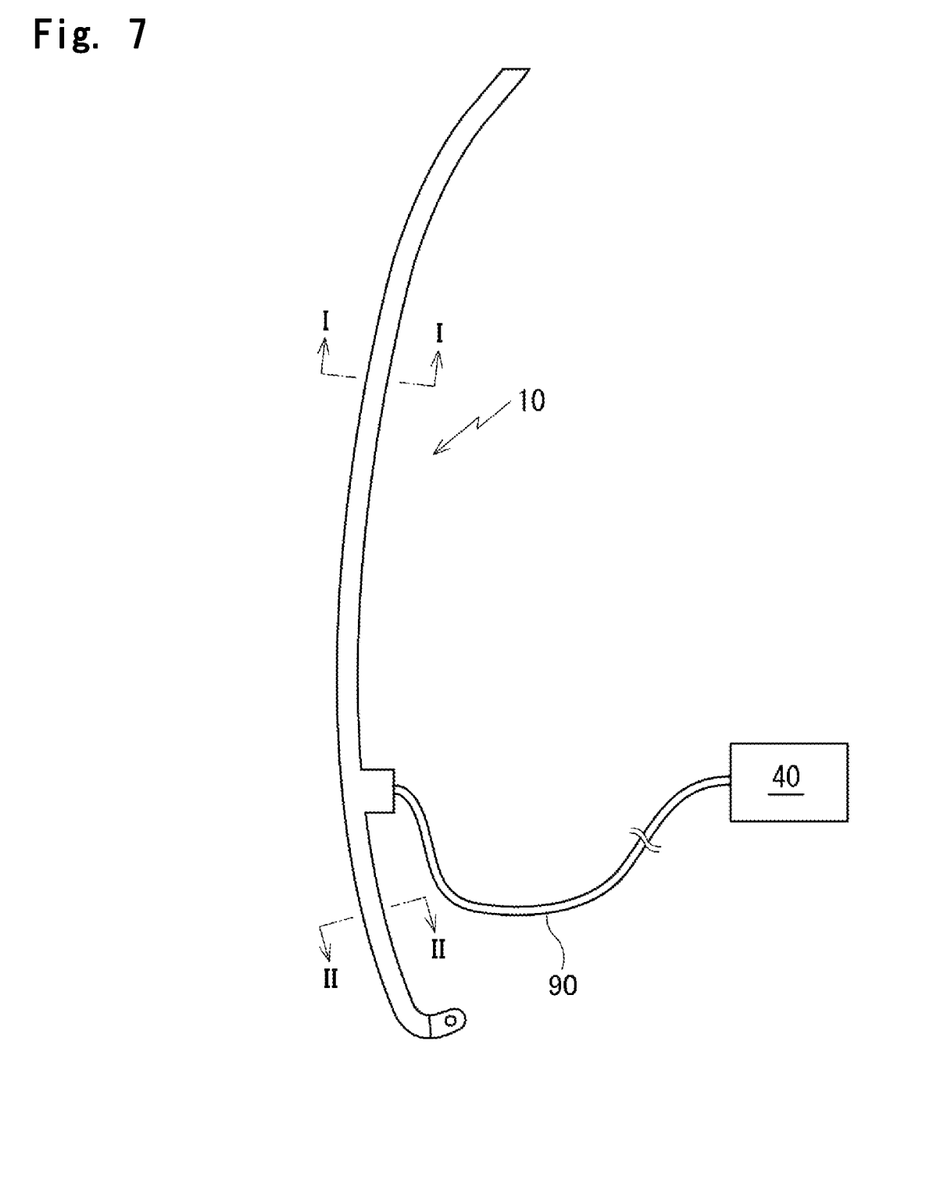
FIG. 7 is a side view of the protector with the sensor of FIG. 5.

For example, the protector 10 with the sensor, extending in an upper and lower direction as shown in FIG. 7, is installed on a front end surface of the sliding door 1. The protector 10 with the sensor extends frontward of the automobile body from the front end surface of the sliding door 1.

Figure 8:
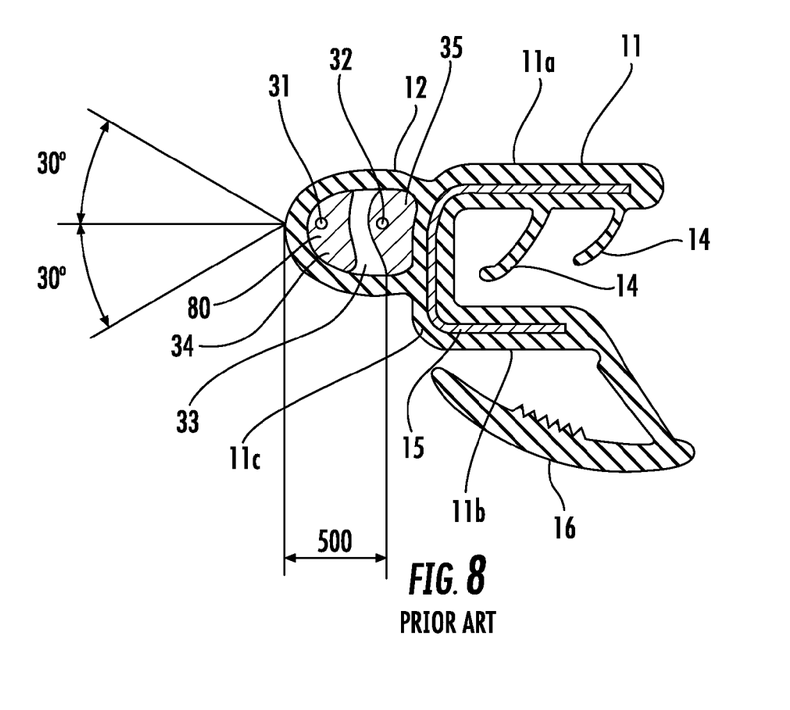
FIG. 8 is an I-I line enlarged cross section of FIG. 7, showing a protector with a sensor according to a prior art.
Figure 9:
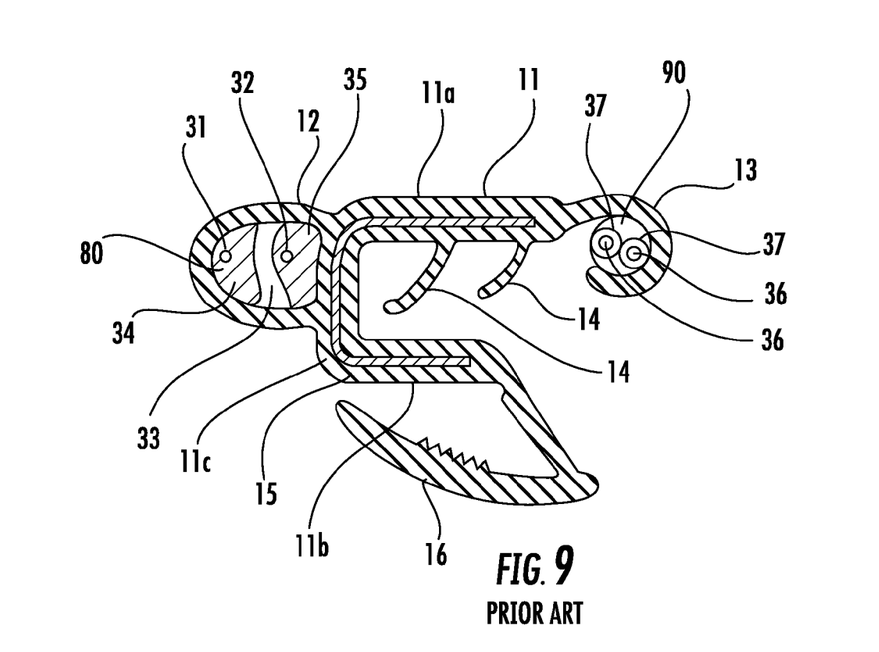
FIG. 9 is an II-II line enlarged cross section of FIG. 7, showing a protector with a sensor according to a prior art.

As shown in FIG. 8 and FIG. 9, the protector 10 with the sensor, installed on the front end surface of the sliding door 1 includes: an installation base member 11 having a substantially U-shaped cross section including an inner-cabin side wall 11a, an outer-cabin side wall 11b and a connecting wall 11c; and a hollow part 12 integrally molded with the installation base member 11. The hollow part 12 includes a sensor (pressure sensitive sensor) 80 which outputs a corresponding electric signal upon detecting the object such as a part of human bodies (fingers, hands or legs) between the sliding door 1 and a body side opening (may also be front door or side door) (see, for example, Japanese examined Patent Publication No. 3334477).

In a lower part of the protector 10 with the sensor, a channel part 13 having a substantially C-shaped cross section is integrally molded with the inner-cabin side wall 11a side of the installation base member 11 for holding wire harness 90 joined with the pressure sensitive sensor 80. The installation base member 11 has a plurality of holding lips 14 formed inside and a core 15 having a substantially U-shaped cross section embedded therein for increasing rigidity. In addition, a decorative lip 16 is provided on the outer-cabin side wall 11b of the installation base member 11.

The sensor (pressure sensitive sensor) 80 has two core wires (electrode wires) 31, 32 extending in an upper and lower direction (longitudinal direction) embedded in rubber like elastic bodies (conductive parts) 34, 35 having conductivity with a space 33 therebetween, which is fixed in the hollow part 12. As the object is disposed between the sliding door 1 and the body side opening when the sliding door 1 is moved towards a closed position, the object makes contact with a part of the hollow part 12, and then the rubber like elastic bodies 34, 35 contact with each other and the two core wires 31, 32 short. Resultant change in electric signal is transmitted to a control unit 40 joined with leads 36, 36 which are connected with the two core wires 31, 32 in a lower side terminal part of the protector 10 with the sensor, and as a result, the objects are detected. The leads 36, 36 covered with insulator are tied by the wire harness 90. Top ends of the leads 36, 36, bared from covered parts 37, 37 are naked wires.

Figure 10A:
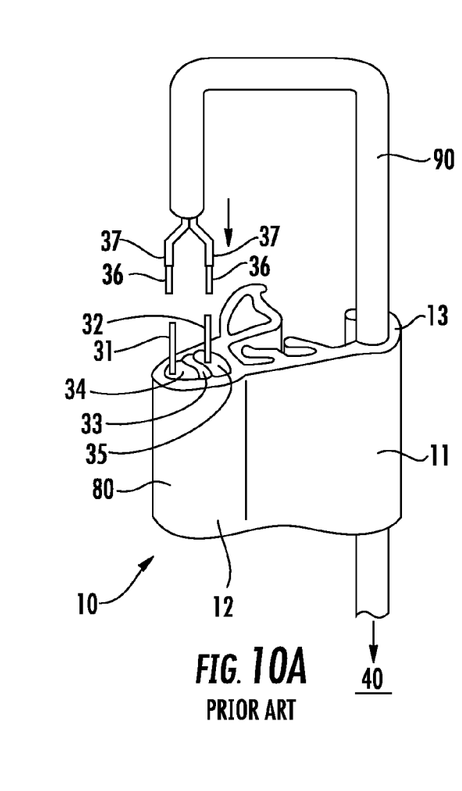
Figure 10B:
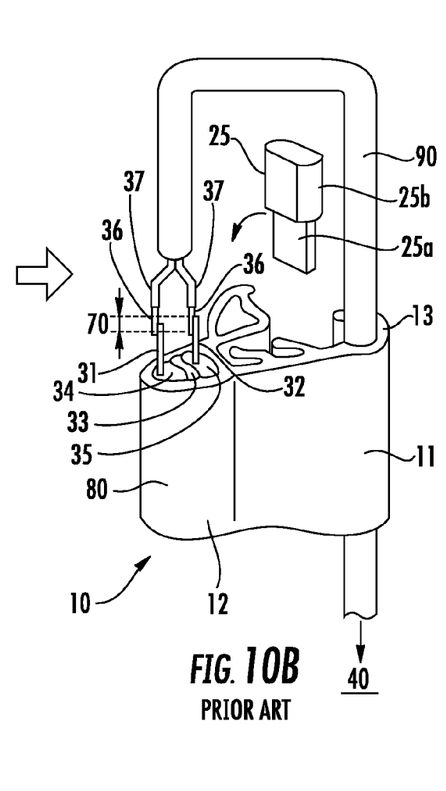
Figure 10C:
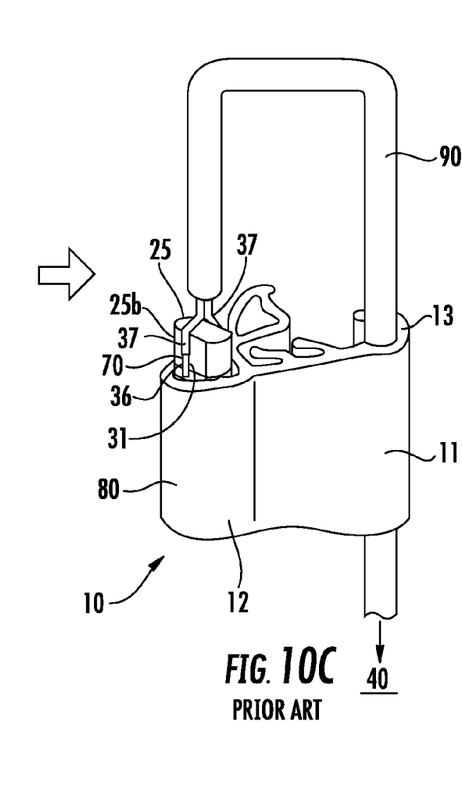

As shown in FIGS. 10(a) to 10(c), in the lower side terminal part of the protector 10 with the sensor, the leads 36 are piled on the two core wires 31, 32 drawn out in a longitudinal direction (left direction in FIGS. 10(a) to 10(c) relative to a sheet), the leads 36 and the two core wires 31, 32 are connected by means of resistance welding or soft soldering (FIG. 10(b)) and an insert 25 fills up the space 33 which is exposed in an end part (FIG. 10(c)). Then, as shown in FIG. 11, wire connection parts 70, 70, the insert 25 and a part of the wire harness 90 are embedded in a die molded part by die molding and are not exposed.

Figure 12:
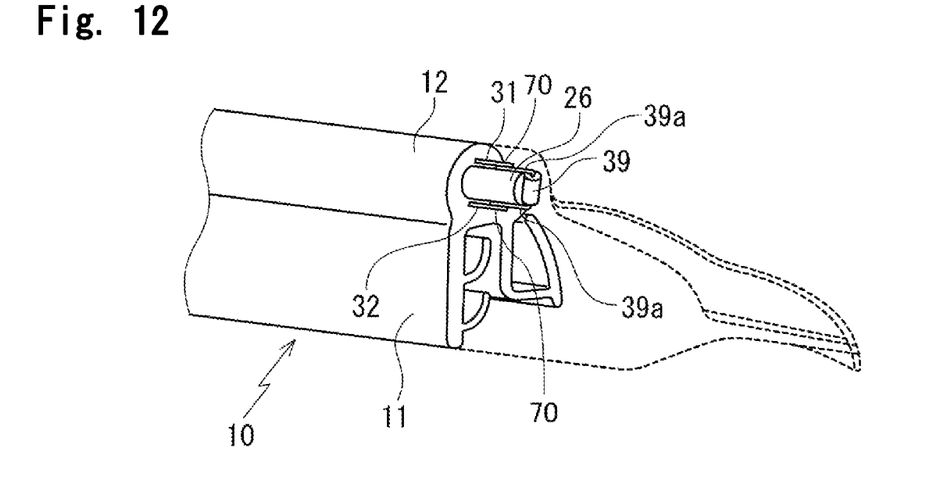
FIG. 12 is a perspective view of a structural gist of an upper side terminal part of the protector with the sensor after die molding.

Also, as shown in FIG. 12, in an upper side terminal part of the protector 10 with the sensor, legs 39a, 39a of a resistor 39 are piled on the two core wires 31, 32 drawn out in the longitudinal direction (right direction in FIG. 12 relative to the sheet), the legs and the two core wires 31, 32 are connected by means of resistance welding or soft soldering and an insert 26 fills up the space 33. Then, the wire connection parts 70, the insert 26 and the resistor 39 are embedded in a die molded part by means of the die molding and are not exposed.

Figure 11:
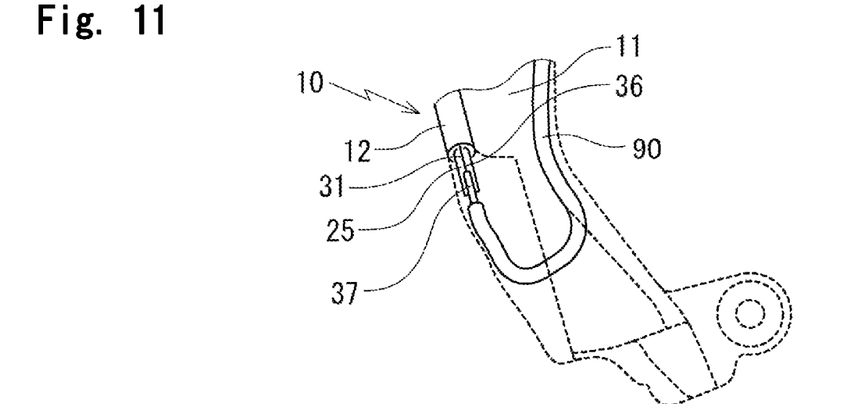
FIG. 11 is a perspective view of a structural gist of the lower side terminal part of the protector with the sensor after die molding.

In FIGS. 11 and 12, dotted lines show the die molded parts.

Unfortunately, however, as shown in FIG. 8, the space 33 between the two rubber like elastic bodies (conductive parts) 34, 35 having conductivity substantially has an oblong shaped (rectangular shaped) cross section. Accordingly, a movable range 500 as a part which bends for detecting the objects is not wide enough. The conductive parts 34, 35 do not bend. Specifically, the objects are detected within a range of about 60° including about 30° toward an inner-cabin side (upper direction in FIG. 8) and about 30° toward an outer-cabin side (lower direction in FIG. 8), respectively. When an angle is larger than 60°, the two conductive parts 34, 35 do not always come into contact with each other and the objects are not always detected even in case the objects exist.

Japanese examined Patent Publication No. 3334477 discloses that the space (opening) between the two conductive parts is long from side to side in cross section, which is substantially rectangular. Accordingly, the objects are detected only within a small angle, and the movable range of the part which bends is narrow.

Therefore, an object of the present invention is to provide the protectors with sensors excellent in capability of detecting the objects.

SUMMARY

In order to achieve the above-mentioned object, according to one aspect of the invention, a protector with a sensor is provided, the protector with the sensor including: an installation base member (11) operatively coupled on a peripheral edge of an opening/closing panel which moves between at least two positions to open and close an opening of an automobile body or on a peripheral edge of said opening of the automobile body, the opening/closing panel including a door (1) and a sun roof (2) of an automobile; and a hollow part (52) unified with the installation base member (11), the hollow part (52) having a shape of a tube, the hollow part (52) having core wires (31, 32), two conductive parts (54, 55) and a space (53) provided therein, the two conductive parts (54, 55) having the core wires (31, 32) embedded therein respectively, the space (53) being positioned between the two conductive parts (54, 55); in which:

when an object is disposed between said opening/closing panel and said opening and makes contact with said hollow part (12) when said opening/closing panel is moved towards a closed position, a corresponding change in electric signal detects said object; and in a terminal part, said core wires (31, 32) drawn out in a longitudinal direction are connected with two leads (36, 36), said two leads (36, 36) being joined with a control unit (40), wherein:

an outer peripheral surface of the hollow part (52) is an outer coat (52a) substantially having a horseshoe shaped cross section; both ends (52b, 52c) of the outer coat (52a) are connected with a right side and a left side of said installation base member (11) at a distance from each other; said two conductive parts (54, 55) include a conductive part (55) having a convex shape on a lower part of the hollow part and a conductive part (54) having a concave shape on an upper part of the hollow part, the lower part of the hollow part being a side of said installation base member (11), the upper part of the hollow part being a side of a top end of the hollow part; and said two conductive parts (54, 55) are shaped and positioned in a manner that said space (53) substantially has a V-shaped cross section, said space (53) substantially has a uniform width in cross section, an opening of the V-shaped cross section faces the side of said installation base member (11), and both ends (53a, 53b) of the V-shaped cross section are continuously provided on an inner surface of said outer coat (52a).

It is to be noted that the "change in electric signal" includes a change by short between the two core wires, and a change in capacitance.

In addition, according to an aspect of the present invention, lower parts (54a) of said conductive part (54) on the upper part of the hollow part are closer to said installation base member (11) than a tip (55a) of the conductive part (55) on the lower part of the hollow part.

In addition, according to an aspect of the present invention, said two conductive parts (54, 55) are shaped and positioned in a manner that the both ends (53a, 53b) of the V-shaped cross section of said space (53) are continuously provided on inner surfaces of both ends (52b, 52c) of said outer coat (52a).

In addition, according to an aspect of the present invention, said two conductive parts (54, 55) are shaped and positioned in a manner that at least a part of one end (53b) of the both ends (53a, 53b) of said V-shaped cross section of said space (53) is continuously provided directly on said installation base member (11).

In addition, according to an aspect of the present invention, the both ends (52b, 52c) of said outer coat (52a) broaden a thickness toward said installation base member (11), the both ends (52b, 52c) being connected with said installation base member (11).

In addition, according to an aspect of the present invention, said two conductive parts (54, 55) and said space (53) in said hollow part (52) as well as said hollow part (52) substantially have a bilateral-symmetrically shaped cross section and said core wires (31, 32) are on an axis (400) of symmetry.

In addition, according to an aspect of the present invention, said installation base member (11), said hollow part (52), said conductive parts (54, 55) and said core wires (31, 32) are integrally molded.

Symbols in parentheses show constituents or items corresponding to the drawings.

According to the present invention, the outer peripheral surface of the hollow part is the outer coat substantially having the horseshoe shaped cross section, and the conductive part having the concave shape on the upper part of the hollow part and the conductive part having the convex shape on the lower part of the hollow part are provided in the hollow part in the manner that the space between the two conductive parts substantially has the V-shaped cross section, the space substantially has the uniform width in cross section, the opening of the V-shaped cross section faces the side of the installation base member, and the both ends of the V-shaped cross section are continuously provided on the inner surface of the outer coat. Accordingly, as compared with a prior art (FIG. 8) which includes a space substantially having an oblong shaped (rectangular shaped) cross section, a movable range of the outer coat of the hollow part which bends for detecting objects is wider. The structure enables detection of the objects over wider ranges on the inner-cabin side and the outer-cabin side.

In addition, the lower parts of the conductive part on the upper part of the hollow part are closer to the installation base member than the tip of the conductive part on the lower part of the hollow part. Accordingly, even slight bending easily touches the conductive parts to each other, thereby providing a protector with a sensor excellent in detecting capability.

In addition, the both ends of the V-shaped cross section of the space are continuously provided on inner surfaces of both ends of the outer coat. The structure enables miniaturization and lightening of the hollow part in the cross section. Also, the structure increases bending amount of the ends of the outer coat, thereby improving the detecting capability.

In addition, at least a part of one of the both ends of the space having the V-shaped cross section is continuously provided directly on the installation base member. The structure further increases the bending amount of the ends of the outer coat, thereby improving the detecting capability.

In addition, the both ends of the outer coat broaden the thickness toward the installation base member with which the both ends are connected. The structure prevents cracks by convex substances, automobile keys for example, in case they are caught on the both ends of the outer coat.

In addition, the two conductive parts and the space in the hollow part as well as the hollow part substantially have the bilateral-symmetrically shaped cross section and the core wires are on the axis of symmetry. Accordingly, in both terminal parts of the protector with sensor, shapes of inserts inserted in the space are simplified for mass production.

In addition, the installation base member, the hollow part, the conductive parts and the core wires are integrally molded. The structure enables to stably produce the protector with the sensor in a reduced time for operation.

The installation base members, the hollow parts, the conductive parts and the core wires of ordinary protectors with the sensors have not been integrally molded.

BRIEF DESCRIPTION OF THE DRAWINGS

FIG. 10(*a*), FIG. 10(*b*) and FIG. 10(*c*) are perspective views of processes before die molding a lower side terminal part of a protector with a sensor;

DETAILED DESCRIPTION

Referring to the Drawings, a protector with a sensor according to an embodiment of the present invention will be described.

A protector 10 with a sensor of the embodiment of the present invention, which extends toward a front side of an automobile body is installed on a front end surface of a sliding door 1 of an automobile shown in FIG. 5 of which the sliding door 1 moves between at least two positions to open and close an opening of the automobile body. A sensor (pressure sensitive sensor) 80 installed on the protector 10 with the sensor outputs corresponding electric signal upon detecting an object such as a part of human body (finger, hand or leg) between the sliding door 1 and a body side opening (may also be front door or side door). Both the present invention and the prior art include the structures of FIG. 7, FIG. 10(*a*), FIG. 10(*b*), FIG. 10(*c*), FIG. 11 and FIG. 12. But FIG. 1 of the present invention, which is an I-I line enlarged cross section of a part of FIG. 7 with a sensor (pressure sensitive sensor) 80, is different from the prior art shown in FIG. 8. When constituents or items correspond to those in prior arts, the same symbols are used.

Figure 1:
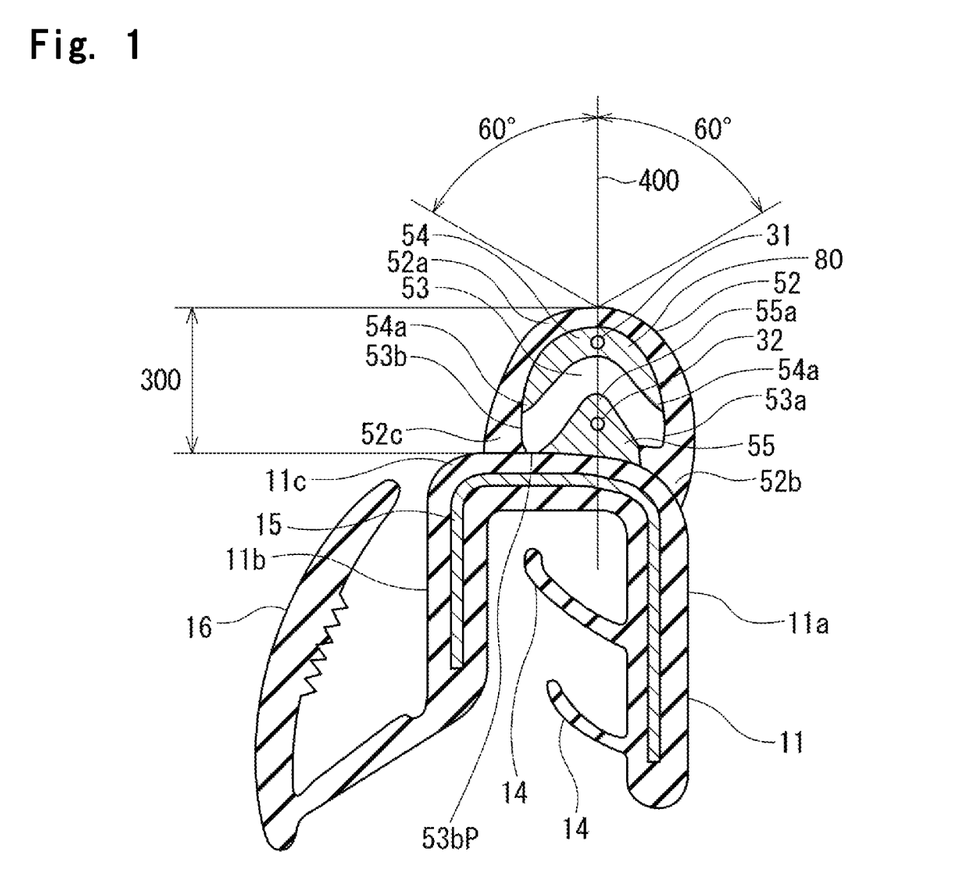
FIG. 1 is an I-I line enlarged cross section of FIG. 7, showing a protector with a sensor according to an embodiment of the present invention.

As shown in FIG. 1, the protector 10 with the sensor includes: an installation base member 11 having a substantially U-shaped cross section including an inner-cabin side wall 11*a*, an outer-cabin side wall 11*b* and a connecting wall 11*c*, which is operatively coupled on a flange (not shown) formed on a sliding door 1 directly; a hollow part 52 which is integrally molded with the installation base member 11, which has a shape of a tube and which makes elastic contact with the object when the object including a finger is disposed between a front end surface of the sliding door 1 and a body side opening which faces the front end surface when the door 1 is moved towards a closed position; and the sensor (pressure sensitive sensor) 80 which is incorporated in the hollow part 52 and which outputs a corresponding electric signal upon detecting the object. The sensor (pressure sensitive sensor) 80 has two core wires (electrode wires) 31, 32 extending in an upper and lower direction (longitudinal direction) embedded in rubber like elastic bodies 54, 55 having conductivity with a space 53 therebetween, which are fixed in the hollow part 52. The rubber like elastic bodies 54, 55 having conductivity are made of conductive rubber mainly including synthetic rubber including EPDM. The sensor 80 is integrally molded with the hollow part 52.

The installation base member 11 has a plurality of holding lips 14, 14 formed inside and a core 15 having a substantially U-shaped cross section embedded therein for increasing rigidity. In addition, a decorative lip 16 is provided on the outer-cabin side wall 11*b* of the installation base member 11.

The hollow part 52 is integrally molded with the connecting wall 11*c* of the installation base member 11. A top end of the hollow part 52 protrudes toward a front side of an automobile.

An outer peripheral surface of the hollow part 52 is an outer coat 52*a* substantially having a horseshoe shaped cross section. Both ends 52*b*, 52*c* of the outer coat 52*a* are connected with a right side and a left side (right side and left side of FIG. 1 relative to a sheet) of the installation base member 11 at a distance from each other. In the present embodiment, an inner-cabin side end 52*b* of the outer coat 52*a* is connected with a corner on which the connecting wall 11*c* and the inner-cabin side wall 11*a* of the installation base member 11 are continuously provided. Also, an outer-cabin side end 52*c* of the outer coat 52*a* is connected with a position at a distance toward (close to) an inner-cabin side from a corner on which the connecting wall 11*c* and the outer-cabin side wall 11*b* are continuously provided.

The both ends 52*b*, 52*c* of the outer coat 52*a* broaden a thickness toward the connecting wall 11*c* of the installation base member 11. The structure prevents cracks by convex substances, automobile keys for example, in case they are caught on the both ends 52*b*, 52*c* of the outer coat 52*a*.

The rubber like elastic bodies 54, 55 having conductivity are conductive parts. The conductive parts include: a conductive part 55 having a convex shape on a lower part of the hollow part 52, which is a side of the installation base member 11 of the hollow part 52; and a conductive part 54 having a concave shape on an upper part of the hollow part 52, which is a side of a top end of the hollow part 52. The conductive part 54 having the concave shape on the upper part of the hollow part 52 has a core wire 31 embedded at a center thereof and the conductive part 55 having the convex shape on the lower part of the hollow part 52 has a core wire 32 embedded at a center thereof.

Positions in the hollow part 52 as well as shapes of the conductive part 54 on the upper part of the hollow part and the conductive part 55 on the lower part determine a shape of the space 53 in cross section between the two conductive parts 54, 55. In the present embodiment, the conductive part 55 on the lower part of the hollow part substantially has a ridge-shaped cross section, a base of which comes into contact with the connecting wall 11*c* of the installation base member 11. The conductive part 54 on the upper part of the hollow part substantially has a crescent-shaped cross section, both ends of which fall from the top end of the hollow part 52 in a manner to approach the connecting wall 11*c* of the installation base member 11.

As a result, the space 53 substantially has a V-shaped cross section and substantially has a uniform width (1.4 mm, in the present embodiment) in cross section, an opening of the V-shaped cross section faces the side of the installation base member 11, and both ends 53*a*, 53*b* of the V-shaped cross section are continuously provided on an inner surface of the outer coat 52a. In the present embodiment, the both ends 53a, 53b of the V-shaped cross section are continuously provided on inner surfaces of both ends 52b, 52c of the outer coat 52a (an inner-cabin side end 53a of the V-shaped cross section is continuously provided on the inner surface of an inner-cabin side end 52b of the outer coat 52a and an outer-cabin side end 53b of the V-shaped cross section is continuously provided on the inner surface of an outer-cabin side end 52c of the outer coat 52a). The conductive part 55 on the lower part of the hollow part is positioned inside the hollow part 52 and shaped in a manner that a part 53bP of the outer-cabin side end 53b of the V-shaped cross section is continuously provided directly on the connecting wall 11c of the installation base member 11.

In addition, the lower parts 54a of the conductive part 54 on the upper part of the hollow part are closer to the installation base member 11 than a tip 55a of the conductive part 55 on the lower part of the hollow part. Accordingly, even slight bending easily touches the two conductive parts 54, 55 to each other, and the two conductive parts 54, 55 do not pass each other on a point of contact.

In addition, an axis 400 of symmetry bilaterally divides the two conductive parts 54, 55 and the space 53 in the hollow part 52 as well as the hollow part 52 into two equal halves in a direction of an inner-cabin side and in a direction of an outer-cabin side. Also, the core wires 31, 32 are on the axis 400 of symmetry.

In the same manner as FIG. 11, in a lower side terminal part of the protector 10 with the sensor, an insert 25 fills up the space 53 of the hollow part 52 which is open in an end side terminal part. Also, in the same manner as FIG. 12, in an upper side terminal part of the protector 10 with the sensor, an insert 26 fills up the space 53 of the hollow part 52 which is open in an end side terminal part.

The insert 25, 26 is made of polypropylene, polyethylene, polyethylene terephthalate, nylon, 6 nylon, 6-6 nylon or thermoplastic elastomer (TPE). Examples of the material of the insert 25, 26 also include flexible and non-conductive material such as olefin TPO or stylene TPS of TPE. The insert 25 includes an insertion part 25a, 26a on a side of one end and a protrusion part 25b, 26b on a side of another end.

The insertion part 25a, 26a has a V-shaped cross section which is substantially the same as or a little larger than the space 53 for being inserted in the space 53 of the hollow part 52 and tightly filling up the space 53, thereby preventing decline in sensor function caused by die molding material flowing in the space 53 during die molding.

The installation base member 11 and the hollow part 52 of the protector 10 with the sensor form an extrusion molded part made of a rubber like elastic body including: synthetic rubber such as EPDM; and thermoplastic elastomer such as TPO, TPS. The upper and lower side terminal parts of the protector 10 with the sensor are die molded for arranging an external shape thereof.

A body of a resistor 39 (electrical component) is stably positioned on an end part of the protrusion part 26b of the insert 26 which is used in the upper side terminal part of the protector 10 with the sensor. The two legs (leads) 39a, 39a of the resistor 39 are piled on the two core wires 31, 32 and the two legs (leads) 39a, 39a and the two core wires 31, 32 are connected by means of resistance welding or soft soldering. The core wires 31, 32 are drawn out toward an upside in the longitudinal direction from the hollow part 52. The insertion part 26a of the insert 26 fills up the space 53. Then, the protrusion part 26b of the insert 26, the wire connection parts 70, 70, and the body and the legs 39a, 39a of the resistor 39 are embedded in a die molded part by die molding the upper end of the protector 10 with the sensor, and are not exposed.

On both side surfaces of the protrusion part 25b of the insert 25 which is used in the lower side terminal part of the protector 10 with the sensor, the two leads 36, 36 are piled on the two core wires 31, 32 and the two leads 36, 36 and the two core wires 31, 32 are connected by means of resistance welding or soft soldering. The two leads 36, 36 as top ends are naked wires bared from covered parts 37. The two core wires 31, 32 are drawn out toward a downside in the longitudinal direction from the hollow part 52. The insertion part 25a of the insert 25 fills up the space 53. Then, the protrusion part 25b of the insert 25 and the wire connection parts 70, 70 are embedded in a die molded part by die molding a lower end of the protector 10 with the sensor and are not exposed. The two leads 36, 36 which are covered with insulator respectively are tied by the wire harness 90 and an outer circumferential surface of the two leads 36, 36 thus tied is coated by skin of the wire harness 90. On an end part of the wire harness 90, the two leads 36, 36 are drawn out from the covered parts 37, 37 which are drawn out from the end part of the wire harness 90, and are bared from the covered parts 37, 37. The wire harness 90 is joined with a control unit 40 in which the object is detected.

According to the protector 10 with the sensor, the outer peripheral surface of the hollow part 52 is the outer coat 52a substantially having the horseshoe shaped cross section, and the conductive part 54 having the concave shape on the upper part of the hollow part and the conductive part 55 having the convex shape on the lower part of the hollow part are provided in the manner that the space 53 between the two conductive parts 54, 55 substantially has the V-shaped cross section, the space 53 substantially has the uniform width in cross section, the opening of the V-shaped cross section faces the side of the installation base member 11, and the both ends 53a, 53b of the V-shaped cross section are continuously provided on the inner surface of the outer coat 52a. Accordingly, as compared with a prior art (FIG. 8) which includes a space 33 substantially having an oblong shaped (rectangular shaped) cross section, a movable range 300 of the outer coat 52a of the hollow part 52 which bends for detecting the objects can be wider. In the present embodiment, the movable range 300 is a distance, from a point of intersection between the axis 400 of symmetry and a position on a surface of the outer coat 52a of the hollow part 52, to a point of intersection between the axis 400 of symmetry and a position on a perpendicular line from a connection point of the outer-cabin side end 52c of the outer coat 52a and the installation base member 11 toward the axis 400 of symmetry (the movable range 300>the movable range 500 of the prior art).

The structure enables detection of the objects over a wider range of about 120° including about 60° on the inner-cabin side (right direction in FIG. 1 relative to a sheet) and about 60° on the outer-cabin side (left direction in FIG. 1 relative to a sheet), respectively.

The axis 400 of symmetry bilaterally divides the two conductive parts 54, 55 and the space 53 as well as the hollow part 52 into two equal halves in the direction of the inner-cabin side and in the direction of the outer-cabin side. Also, the core wires 31, 32 are on the axis 400 of symmetry. Accordingly, in both terminal parts of the protector with sensor, the shapes of the inserts 25, 26 inserted in the space are simplified for mass production.

In addition, the installation base member 11, the hollow part 52, the conductive parts 54, 55 and the core wires 31, 32 are integrally molded. The structure enables to stably produce the protector 10 with the sensor in a reduced time for operation.

The installation base members 11, the hollow parts 52, the conductive parts 54, 55 and the core wires 31, 32 of ordinary protectors 10 with the sensors have not been integrally molded.

Figure 2:
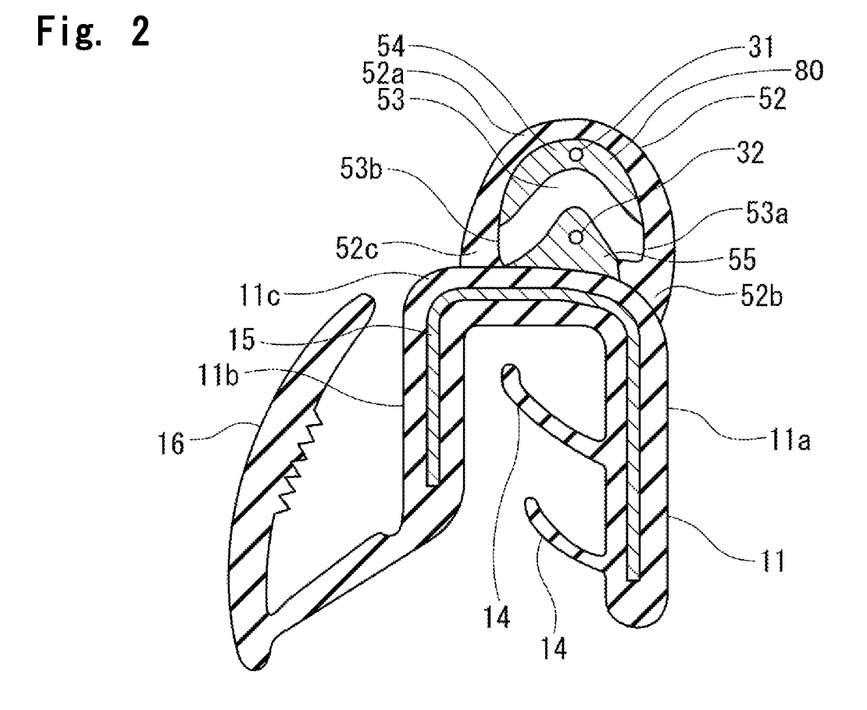
FIG. 2 is an I-I line enlarged cross section of FIG. 7, showing another protector with a sensor according to an embodiment of the present invention.

In the present embodiment, the part 53bP of the outer-cabin side end 53b of the V-shaped cross section is continuously provided directly on the connecting wall 11c of the installation base member 11 for enlarging bending amount of the outer-cabin side end 52c of the outer coat 52a, thereby improving the detecting capability. But, as shown in FIG. 2, the outer-cabin side end 53b as a whole may be continuously provided on the inner surface of the outer-cabin side end 52c of the outer coat 52a so that even a part of the outer-cabin side end 53b is not continuously provided directly on the connecting wall 11c of the installation base member 11.

Figure 3:
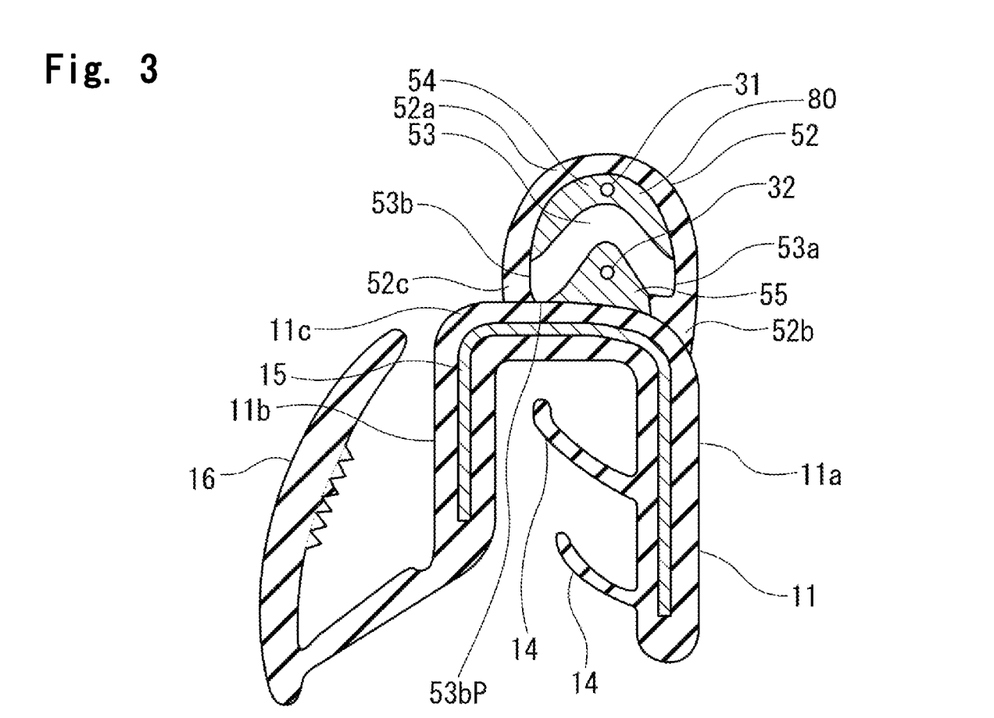
FIG. 3 is an I-I line enlarged cross section of FIG. 7, showing still another protector with a sensor according to an embodiment of the present invention.

Also, in the present embodiment, the both ends 52b, 52c of the outer coat 52a forming the hollow part 52 broaden a thickness toward the connecting wall 11c of the installation base member 11. But, as shown in FIG. 3, the thickness may be substantially uniform for improving sensing capability.

In the present embodiment, the both ends 53a, 53b of the V-shaped cross section of the space 53 are continuously provided on the inner surfaces of the both ends 52b, 52c of the outer coat 52a forming the hollow part 52. But, as shown in FIG. 4, the both ends 53a, 53b may be continuously provided on the inner surfaces of parts of the outer coat 52a at distances from the both ends 52b, 52c of the outer coat 52a.

Figure 4:
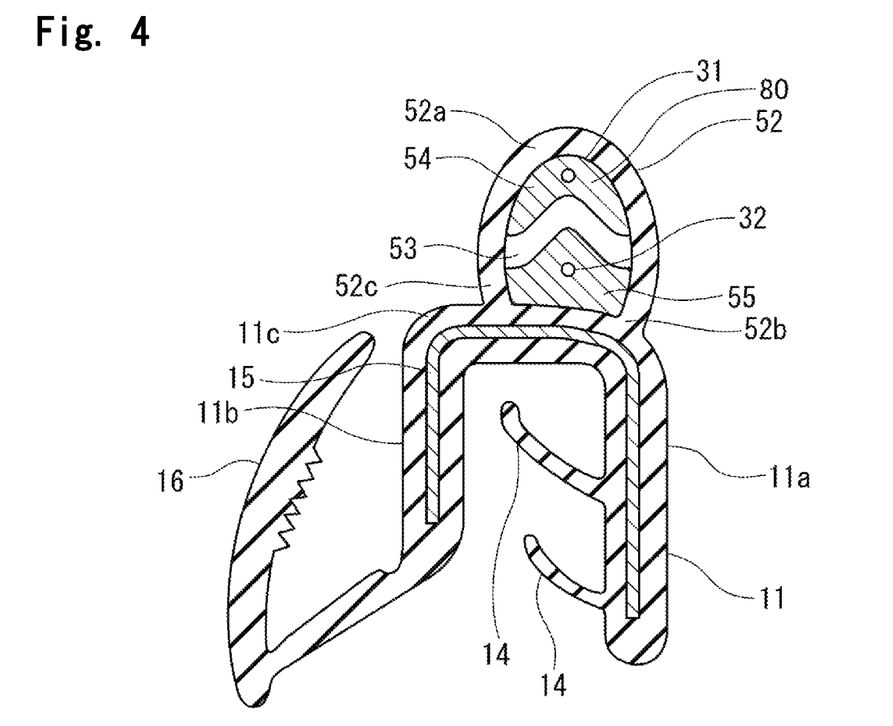
FIG. 4 is an I-I line enlarged cross section of FIG. 7, showing still another protector with a sensor according to an embodiment of the present invention.

As compared with FIG. 4, the structure of FIG. 1 is improved in miniaturization and lightening of the hollow part 52 in the cross section.

While the present embodiment specifies an example that the installation base member 11, the hollow part 52 and the sensor 80 are integrally molded, the installation base member 11, the hollow part 52 and the sensor 80 may be separately molded so that the installation base member 11 and the hollow part 52 are fixed by adhesive or adhesive tape, and the sensor 80 is inserted in the hollow part 52 for unification. Alternatively, any two of the installation base member 11, the hollow part 52 and the sensor 80 may be integrally molded and a remaining member is separately molded.

In the present embodiment, the installation base member 11 has a plurality of holding lips 14 formed inside and a core 15 having a substantially U-shaped cross section embedded therein. But the installation base member 11 may have only one holding lip 14, 14 or may be without the core 15 embedded therein. Also, the installation base member 11 may have any shape as long as the installation base member 11 has a part thereof for fixing the hollow part 52 and the sensor 80 thereon, of which examples include the U-shaped cross section of the present embodiment. Methods of fixing the hollow part 52 and the sensor 80 on the sliding door 1 vary, including use of adhesive tape as well as gripping and fitting the hollow part 52 and the sensor 80.

The present embodiment specifies an example that the protector 10 with the sensor is installed on the sliding door 1 side of the automobile, which slides frontward and rearward. But the protector 10 with the sensor may be installed on the body side opening for detecting the object between the sliding door and the body side opening.

Also, the protector 10 with the sensor is applicable to a back door or a sun roof 2 (FIG. 6).

We claim:

1. A protector with a sensor, the protector comprising:
   an installation base member operatively coupled to at least one of a peripheral edge of a panel which moves between an open position and a closed position to respectively open and close an opening in a body of an automobile and a peripheral edge of said opening of the body, the panel being at least one of a door and a sun roof of the automobile; and
   a cylindrically-shaped hollow part, the hollow part having first and second conductive parts disposed therein with core wires embedded in the first and second conductive parts, wherein a space is provided within the hollow part, is disposed between the first and second conductive parts, and is defined by at least a portion of the installation base member; wherein:
   an object disposed between said panel and said opening is detected when the object makes contact with said hollow part as said panel is moved towards the closed position and causes the first and second conductive parts to contact each other which generates an electric signal; and
   said core wires extend in a longitudinal direction of the hollow part and are connected to a control unit, wherein:
   the hollow part comprises a wall having a substantially horseshoe shaped cross section having first and second ends; the first and second ends of the wall coupled to said installation base member, the first and second ends of the wall being spaced apart from one another;
   said first conductive part having a convex shape and disposed at a proximal portion of the hollow part and said second conductive part having a concave shape and disposed at a distal portion of the hollow part, the proximal portion of the hollow part being adjacent said installation base member, the distal portion of the hollow part being positioned away from said installation base member; and said space between said first and second conductive parts having a substantially V-shaped cross section, said V-shaped cross section being substantially uniform in width, an apex of the V-shaped cross section being disposed away from said installation base member, and first and second ends of the V-shaped cross section delimited by an inner surface of said wall;
   wherein at least a portion of said first end of said V-shaped cross section is defined by the portion of said installation base member and the second end of said V-shaped cross section is defined entirely by the inner surface of the wall; and
   a length of said inner surface of said wall delimiting the first end of said V-shaped cross section is greater than a length of the portion of said installation base member.

2. The protector with a sensor as claimed in claim 1, wherein: portions of said second conductive part are closer to said installation base member than an apex of the first conductive part.

3. The protector with a sensor as claimed in claim 2, wherein: each of the first and second ends of the V-shaped cross section is defined by the inner surface of said wall.

4. The protector with a sensor as claimed in claim 3, wherein: a thickness of said wall varies.

5. The protector with a sensor as claimed in claim 2, wherein: a thickness of said wall varies.

6. The protector with a sensor as claimed in claim 1, wherein: each of the first and second ends of the V-shaped cross section is defined by the inner surface of said wall.

7. The protector with a sensor as claimed in claim 6, wherein: a thickness of said wall varies.

8. The protector with a sensor as claimed in claim 1, wherein: a thickness of said wall varies.

* * * * *